United States Patent [19]

Heitmann

[11] 4,186,236
[45] Jan. 29, 1980

[54] PINHOLE FREE ASPHALT COATING FOR A FIBROUS MAT AND PROCESS FOR MAKING THE SAME THROUGH USE OF A THIXOTROPIC ASPHALT EMULSION

[75] Inventor: Glenn A. Heitmann, Morrison, Colo.

[73] Assignee: Johns-Manville Corporation, Denver, Colo.

[21] Appl. No.: 729,501

[22] Filed: Oct. 4, 1976

[51] Int. Cl.² ............... B32B 5/24; B32B 11/10; C08L 95/00; C09D 3/24

[52] U.S. Cl. ................... 428/291; 106/277; 252/311.5; 427/209; 427/373; 428/313; 428/315; 428/320; 428/322; 428/341; 428/489

[58] Field of Search ............ 106/277; 428/489, 291, 428/313, 315, 320, 322, 341; 252/311.5; 427/209, 373

[56] References Cited

U.S. PATENT DOCUMENTS

| | | | |
|---|---|---|---|
| 1,690,020 | 10/1928 | Kirschbraun | 106/277 |
| 1,734,437 | 11/1929 | Kirschbraun | 106/277 |
| 1,865,634 | 7/1932 | Kirschbraun | 428/291 |
| 1,884,919 | 10/1932 | Thompson | 252/311.5 |
| 2,475,781 | 7/1949 | Gallup | 428/291 |
| 3,336,146 | 8/1967 | Henschel | 106/277 |
| 3,493,408 | 2/1970 | Drukker | 106/277 |
| 3,539,368 | 11/1970 | Timmons et al. | 106/277 |
| 3,676,198 | 7/1972 | McGroarty | 106/277 |
| 3,869,297 | 3/1975 | Bellomy | 106/277 |
| 3,940,540 | 2/1976 | Schmidt | 428/291 |
| 4,018,730 | 4/1977 | McDonald | 106/277 |
| 4,035,544 | 7/1977 | Iwasaki et al. | 428/291 |
| 4,056,401 | 11/1977 | DeBough | 106/277 |

*Primary Examiner*—J. C. Cannon
*Attorney, Agent, or Firm*—Robert M. Krone; Joseph J. Kelly; Gregory W. O'Connor

[57] ABSTRACT

A pinhole free, asphalt coated fibrous mat is disclosed herein. This mat is made by selecting a fibrous base mat and preparing or otherwise providing a thixotropic mixture including asphalt emulsion and an additive for making the mixture thixotropic. The mixture is coated onto at least one side of the mat and the coated mat is dried, thereby driving off the water from the mixture and at the same time breaking the asphalt emulsion.

9 Claims, 2 Drawing Figures

PINHOLE FREE ASPHALT COATING FOR A FIBROUS MAT AND PROCESS FOR MAKING THE SAME THROUGH USE OF A THIXOTROPIC ASPHALT EMULSION

BACKGROUND OF THE INVENTION

The present invention relates generally to asphalt coated fibrous mats and more particularly to an asphalt coated mat which in one embodiment is especially suitable as a roofing membrane, for example as a roofing underlayment, and which in a second embodiment is especially suitable as a facing material for foamed resin sheet material.

For many years, the roofing industry has utilized asphalt saturated ragfelt or other such organic fibrous mat as a water impervious membrane, for example as a shingle underlayment or as part of a built-up roof. More recently, a number of companies in the roofing industry have turned their attention to glass fiber material as a substitute for ragfelt in this particular area. However, whether the roofing membrane has an organic base or an inorganic base, there are a number of required physical characteristics which it must exhibit, of course depending upon its ultimate intended use. For example, the membrane must meet minimum strength requirements, again depending upon its ultimate intended use, it must have a certain degree of resistance to the elements, for example to extremely low temperatures and extremely high temperatures, and it must be a product which can be readily handled and applied in the field. Moreover, the membrane must be one which reliably performs its main function which of course is to act as a barrier to liquids, specifically water. It is primarily this latter characteristic, i.e., the water impermeability of the membrane, that Applicant finds the prior art membranes lacking and to which the present invention is directed, as will become apparent hereinafter.

The main reason that many presently available asphalt roofing membranes are not completely satisfactory as water barriers resides primarily in the selection of the asphalt coatings. More particularly, most if not all of the asphalt mixtures are applied hot, that is, the asphalt in the mixture is heated to its melting point before being applied to the base sheet. The particular type of asphalt selected will depend on the nature of the base sheet itself. For example, where the base sheet is organic, for example ragfelt, the asphalt will generally be a saturant asphalt, i.e., one having a melting point of about 115° F.–150° F. and where the base sheet is inorganic, specifically glass mat, the asphalt selected will generally be a coating asphalt having a melting point of about 200° F.–240° F. In either case, Applicant has found that when a reasonable amount of the asphalt or what should be a reasonable amount is applied to the base sheet by means of the typical "hot melt" procedure, the ultimate article is far from pinhole free. Applicant has found this to be true even where a large amount of asphalt is used to saturate or coat the base sheet. The exact reason why pinholes occur is not exactly clear. However, the fact that they do occur reduces substantially the water impermeability of the membrane.

Another drawback resulting from this hot melt procedure is that the end product, specifically the asphalt in the end product, tends to be extremely tacky when subjected to high ambient temperatures. This is of particular concern where the membrane is packaged and shipped in rolls. If a separating medium is not used, the material if subjected to high ambient temperatures will tend to stick to itself in the roll. To prevent this from occurring, as the membrane is produced and rolled, a separating medium, for example sand or talc, is applied between its various layers. While this separating medium functions in the manner intended, it does add cost to the end product and also weight. Moreover, it tends to be a nuisance to the roofer.

As will be seen hereinafter, by selecting a particular asphalt mixture, specifically one meeting certain criteria, Applicant has substantially reduced if not completely eliminated the pinholes from his ultimately formed membrane. Moreover, this membrane does not tend to become tacky when exposed to high ambient temperatures and hence can be packaged in rolls without utilizing talc, sand or other such separating mediums.

SUMMARY OF THE INVENTION

One object of the present invention is to provide a composite article, specifically an asphalt coated fibrous mat, which is substantially completely impervious to liquids, specifically water.

Another object of the present invention is to provide a composite article, specifically the asphalt coated fibrous mat, which can be readily rolled upon itself, even when subjected to high ambient temperatures, without sticking to itself and without utilizing a separating medium such as talc or sand.

A further object of the present invention is to provide a process for manufacturing the article just described in a way which makes it water impervious and in a way which makes it stick-resistant, even when exposed to high ambient temperatures.

As just stated, one object of the present invention is to provide a composite article, specifically an asphalt coated fibrous mat, which is substantially completely water impermeable, even to the extent that the finished article is pinhole free. Another object is to provide a composite article which is not tacky, i.e., stick-resistant, even when exposed to relatively high ambient temperatures for long periods of time for example 200° F. for 48 hours (under 1 psi pressure). This is accomplished in accordance with the present invention by providing a thixotropic mixture including asphalt emulsion and an additive for making the mixture thixotropic. At least one side of a fibrous base sheet, specifically a relatively thin glass fiber mat in the preferred embodiment, is coated with this thixotropic mixture, preferably with the mixture being maintained at the ambient temperature, and the coated base sheet is dried to form the ultimate article.

In accordance with the preferred embodiment of the present invention, the additive selected for making the mixture thixotropic is bentonite clay, preferably Wyoming bentonite clay, as will be discussed in more detail hereinafter. This additive in and by itself will cause the mixture to be thixotropic. However, in accordance with a most preferred embodiment of the present invention, a second additive is used to make the mixture basic, i.e., having a pH of at least 7. In doing this, Applicant has found that he can improve or "fine tune" the thixotropic characteristic of the mixture over and above what is obtained by utilizing the bentonite clay. In this regard, Applicant has also found that by maximizing the thixotropic characteristics of the mixture (within practical limitations) he can more reliably produce a pinhole free article and hence one which is substantially completely water impermeable.

There are several ways in which an article of the type described can be utilized. For example, it is most advantageously utilized as a roofing membrane, either as a shingle underlayment or as part of a built-up roof, as discussed previously. Both of the attributes of the article, that is, its water impermeability and its resistance to high temperatures make it particularly well suited for this application.

The membrane can be shipped in rolls without the fear of it sticking to itself, even if subjected to relatively high ambient temperatures during shipment. This in and of itself results in a number of advantages. The extra cost in providing a suitable separating medium is eliminated as are the facilities which otherwise would be required to store it. The shipping cost would be less since the individual rolls without sand or talc or other such separating medium would weigh less. Moreover, apart from economic considerations, the utilization of a separating medium such as sand or talc has heretofore been a nuisance to the roofer and hence elimination of this separating medium also eliminates this nuisance.

The fact that the article is pinhole free and hence substantially water impervious is of course basic to its intended use as a roofing membrane. The advantage of such an attribute is obvious. However, what may not be so obvious is that the particular process disclosed herein has been found to provide a pinhole free article with substantially less asphalt mixture than is required in articles made by the hot melt procedure discussed previously. This results in a two-fold cost reduction. First, the cost attributed directly to the asphalt is reduced and second the overall weight of the article is reduced, thereby reducing shipping costs.

From the foregoing, it should be quite clear that the composite article manufactured in accordance with the present invention is one which may be most advantageously utilized as a roofing membrane. However, Applicant has also found that this composite article can be advantageously utilized as a facing for foamed resin sheet material. This is primarily because the article can be manufactured substantially pinhole free. More specifically, the only practical way to combine an asphalt coated fibrous mat with foamed resin sheet material is to foam the resin in place directly on the mat. This cannot be done if the mat includes holes through it, even pinholes. The material to be foamed, before actual foaming thereof, tends to pass right through the mat and attack the surrounding apparatus. This material does not pass through the pinhole free asphalt coated mat of the present invention and hence can be foamed directly on the mat so that the latter forms one face thereof.

DETAILED DESCRIPTION OF THE DRAWING

Figure 1:
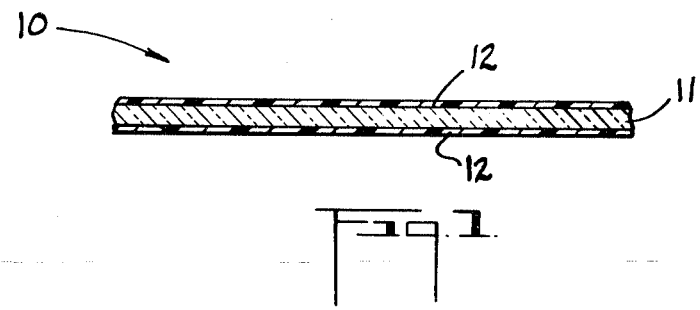
FIG. 1 is a cross-sectional view of a composite article, specifically a roofing membrane, constructed in accordance with the present invention.

Turning to FIG. 1, a composite article is illustrated and generally designated by the reference numeral 10. This article is comprised of a fibrous base sheet 11 having a continuous solid film 12 adhered to each side thereof. As discussed previously and as will be discussed in more detail hereinafter, composite article 10 is imprevious to liquids, specifically water, and although the film 12 is primarily asphalt, it does not become tacky to the touch when subjected to relatively high ambient temperatures, for example temperatures as high as 200° F. for long periods of time, for example 48 hours. These attributes make composite article 10 extremely suitable for use as a roofing membrane generally and as either an underlayment or part of a built-up roof in particular.

The specific type of base sheet 11 utilized in composite article 10 will depend upon the ultimate intended use of the article and those physical characteristics which that intended use requires such as, for example, tensile strength, tear strength and the like. In this regard, those skilled in the art will be able to readily select the particular base sheet and physical attributes of the sheet necessary for the ultimate intended use of the composite article. The sheet may be constructed of organic fibers such as ragfelt or inorganic fibers such as glass. It may be relatively thin or relatively thick and it may be constructed of a single type of fiber, a number of different types of fibers or a combination of fibers and other substances, for example binders, again depending upon the ultimate intended use of the article. However, the base sheet must of course be selected so as to be compatible with film 12, which will be described in detail below, and it must be compatible with the primary objectives of the present invention that is to provide a composite article which is pinhole free, that is, substantially completely water impermeable, and which is not tacky to the touch when exposed to the relatively high ambient temperatures referred to previously for relatively long periods of time. Based on the teachings of the present invention, one skilled in the art could readily select the appropriate base sheet.

As stated previously, composite article 10, in one preferred embodiment, is a roofing membrane, specifically a roofing underlayment or built-up roof membrane. With the composite article functioning in this manner, base sheet 11 would be relatively thin and it could be constructed of organic fiber such as ragfelt or it could be constructed of inorganic glass mat. It could be made by either a conventional dry forming process or a conventional wet forming process.

In an actual working embodiment of the present invention where the ultimately formed article is to be used as a roof underlayment base sheet 11 is a glass fiber mat made by a conventional wet forming process, specifically a Fourdrinier type process. The mat is approximately 17 mils thick and weighs approximately 1.05 lbs/100 ft$^2$. It is constructed of a web of textile type monofilament glass fibers, for example E glass, approximately 13-14 microns in diameter (K fiber) and approximately 25.4 centimeters long. This web which may but does not necessarily include reinforcement fibers in the form of bundles, is held together by a suitable binding substance, for example urea formaldehyde resin. This particular base sheet is well suited as a component in a roofing membrane and particularly in a roofing underlayment. It may or may not be well suited in other applications. Where the article is to be used as a component in a built-up roof, it may be necessary to make slight changes in the thickness and/or weight of the glass mat and particular glass fibers used therein. However, those skilled in the art could readily make these modifications, if necessary. Moreover, in order to avoid blistering problems on the roof, the ultimately formed BUR membrane will generally be perforated prior to its application on the roof.

Having described base sheet 11, attention is now directed to film 12 and the particular components making up this film. As stated previously, the film is comprised primarily of asphalt but it also includes other components to be discussed. As also stated previously, this asphalt base film is substantially completely water impermeable and is not tacky to the touch, even when subjected to relatively high ambient temperatures for long periods of time. In order to make the film water impermeable, in fact pinhole free, and to give it this anti-stick quality, the particular way in which the film is formed is very important. In accordance with the present invention, this film starts as a thixotropic mixture which includes asphalt emulsion and an additive for making the mixture thixotropic and which is coated cold, that is, at room temperature. These characteristics of the mixture, all of which will be discussed in more detail below, are responsible for making the ultimately formed film both pinhole free and stick resistant.

The asphalt itself may be of any suitable type which is readily available and economical. It may be a coating asphalt, a saturant type asphalt, or even a flux asphalt. However, its softening point and penetration should not be below a level which makes it tacky and generally difficult to work with and by the same token, its melting point should not be so high that the asphalt cannot be readily emulsified. With regard to this latter point, the importance of providing an asphalt emulsion should be noted. Where the asphalt in the mixture is not an emulsion, it is difficult if not impossible to apply it cold as in the present invention, but as a general rule must be applied hot, specifically at its melting point. Moreover, the ultimate film does not tend to be pinhole free and it is generally not stick resistant but rather quite tacky when subjected for prolonged periods to the relatively high ambient temperatures discussed previously.

The asphalt emulsion itself is of course comprised of a dispersed phase, i.e., the asphalt, a continuous phase, i.e., the emulsion medium and an emulsifying agent or stabilizer. Any suitable emulsion medium may be provided so long it is compatible with the asphalt and with the present invention generally. From both a cost standpoint and availability standpoint as well as from the standpoint of compatibility, the preferred medium is water. The exact ratio between asphalt and water is not critical so long as there is sufficient water to dilute the emulsion to allow the addition of the thixotropic agent and fillers and not so much water that there is too little asphalt in the coating to form a pinhole free film. The particular emulsifying agent utilized is not critical either. Any suitable agent will suffice. However, for reasons to become apparent hereinafter, bentonite clay in an amount sufficient to act as an emulsifying agent or stabilizer is preferred. In an actual working embodiment of the present invention the asphalt emulsion utilized is one made available by Johns-Manville Corporation under the Trademark TOPGARD TYPE "B" which is comprised of asphalt and water in a 55/45 ratio and which utilizes bentonite clay as its emulsifying agent.

As stated above, the mixture ultimately forming film 12 not only includes an asphalt emulsion but also an additive for making the mixture thixotropic. In this regard, it should be pointed out that the term thixotropy or thixotropic is well known in the art. As defined in the *Condensed Chemical Dictionary*, 6th edition, Reinhold, it means:

The property enabling certain colloidal gels to liquify when agitated (as by shaking or ultra-sonic sound) and then to return to the jelly-like form when at rest.

Defined in a slightly different way, it refers to a mixture having a viscosity which drops when the mixture is subjected to shear, and which increases to its original level upon removing the shearing force. There are a number of products which are presently available and which display similar thixotropic characteristics. One such product is paint. The advantages of a thixotropic paint have been known for a number of years. This property allows the paint to be applied with relative ease while minimizing drippage during application. Of course, this is not why the asphalt mixture of the present invention is thixotropic but rather because this attribute of this mixture is a primary reason why the film is formed in a pinhole free fashion. The degree to which the mixture is thixotropic will affect how water impermeable the ultimate film is and how much asphalt coating is required to make the film pinhole free. The more thixotropic the mixture is the less asphalt coating is required to make the film completely pinhole free, of course within practical limits. As will be discussed hereinafter, a minimum amount of asphalt coating is required. Moreover, the mixture if too thixotropic may be difficult to work with. For example, it may be difficult to spread onto a base sheet. Based on the teachings of the present invention, one with skill in the art can readily determine how thixotropic the mixture needs to be.

Any suitable thixotropy additive may be utilized so long as it is compatible with the rest of the components in the mixture. For example, one such additive found to work is manufactured by Cabot Corporation under the tradename Cab-O-Sil and is a very high surface area, amorphous fumed silica. However, the preferred additive and the one which is utilized in an actual working embodiment of the present invention is bentonite clay. There are a number of advantages in using this particular additive. First, a small amount is already present in the actual asphalt emulsion utilized, as an emulsifying agent or stabilizer, as stated above, and hence any incompatability problems between the stabilizer and the thixotropy additive are eliminated. Second, where the fibrous base sheet is glass, the bentonite clay will tend to prevent the glass from shrinking, particularly when the latter is subjected to high temperatures resulting from fires. Third, while the bentonite by itself may be utilized to make the mixture thixotropic, it can be readily combined with an additive which makes the mixture basic (a pH of at least 7). This second additive, which controls the pH of the mixture bringing it to a level of 7 or above, preferably about 9, in combination with the bentonite, improves the thixotropic characteristic of the mixture. It allows this characteristic to be more accurately attained and fine tuned, that is, accurately adjusted to the desired level. Not all thixotropic additives will combine with a pH agent to perform in this way. Any suitable pH agent may be utilized such as, for example, sodium hydroxide. Where the water itself used in the mixture has a pH of 7 or above, a pH agent may not be necessary.

The asphalt mixture may or may not include other components in addition to the asphalt emulsion and thixotropy additives. In a preferred embodiment of the present invention and in an actual working embodiment thereof, the mixture includes talc and a low density filler, specifically diatomaceous earth. The talc, for example Cyprus Industrial Minerals Company's FROST talc, is incorporated to improve fire resistance and the low density filler, for example Johns-Manville's 305 CELITE diatomaceous earth, is incorporated to make the mixture moisture vapor permeable without making it liquid permeable. The asphalt mixture may include other ingredients apart from the asphalt emulsion, the thixotropy additive, and both the talc and diatomaceous earth so long as these additional components are not incompatible with those already making up the mixture and so long as the additional components do not act contrary to the present invention. However, in a preferred embodiment of the present invention and in an actual working embodiment thereof, the mixture consists essentially of those ingredients described above, i.e., the asphalt emulsion, the bentonite clay, the talc and the diatomaceous earth and a pH agent where necessary. This preferred mixture does however include additional water so that the overall mixture has a solids content of at least 30% but not more than 45%. Below this lower solids level, the mixture would be more dilute than necessary and hence it would utilize more water and bentonite than necessary, requiring more energy to dry. Moreover, it would be difficult to make the mixture thixotropic. Above this upper solids level, the mixture would be too viscous and, again, it would be difficult to control thixotropy.

The exact amount of each component making up the asphalt mixture will depend upon a number of factors including the particular component and the ultimate intended use of the mixture. As just stated, the entire mixture includes sufficient water (including the water in the emulsion) to provide the mixture with a solids content between approximately 30% and 45%. In a preferred embodiment of the present invention, asphalt (from the emulsion), bentonite clay, talc and diatomaceous earth are included in the mixture in the following amounts by dry weight:

| | |
|---|---|
| asphalt | 25% to 95% |
| bentonite clay | 0.2% to 20% |
| talc | 0% to 75% |
| diatomaceous earth | 0% to 30% |

With less asphalt than indicated, it may be difficult to coat the glass mat and with more than indicated, it may be difficult to make the mixture thixotropic and, in any event, it would be difficult to provide all of the other components desired. If less bentonite clay than indicated is used it may be difficult to make the mixture thixotropic and if more than indicated is used the mixture may be too thixotropic and difficult to apply to the mat. If more talc and/or diatomaceous earth than indicated is used, the ultimate product may be too brittle for its intended use.

In an actual working embodiment of the present invention where composite article 10 is utilized as a roofing membrane, the asphalt mixture has the same solids content as above but includes the foregoing ingredients in the following amounts by dry weight:

| | |
|---|---|
| asphalt | 60% to 70% |
| bentonite clay | 10% to 15% |
| talc | 5% to 10% |
| diatomaceous earth | 10% to 20% |

As stated previously, the thixotropic mixture just described is utilized in manufacturing composite article 10. The manufacturing process initially calls for selecting a particular fibrous mat 11 of the type described previously. The thixotropic asphalt mixture is prepared or otherwise provided and at least one side of the mat is coated with this mixture. The mixture is not heated prior to application but is rather applied cold, i.e., at room temperature. Thereafter, the coated mat is dried so as to drive off the water from the mixture and so as to break the asphalt emulsion, thereby solidifying the coating and forming film 12. Both sides of mat 11 may or may not be coated with the asphalt mixture and provided with a film 12 depending upon the ultimate intended use of the composite article. For example, where the article is intended as a roofing membrane, it would be most advantageous to coat both sides. On the other hand, where the article is to be used as a facing for foamed resin, as will be discussed below, it may only be necessary to coat one side of the mat, specifically the side to be exposed.

The amount of asphalt mixture required in forming films 12 will not necessarily depend upon the ultimate intended use of article 10 but rather on the particular type of base sheet 11 which is selected. More specifically, the amount of mixture utilized must be sufficient to form a liquid impervious pinhole free film 12. The amount required to accomplish this may vary with the particular density, thickness and type of base sheet selected as well as the particular ingredients and amounts of ingredients in the mixture itself. However, based on these factors and based on the teachings disclosed herein, one with skill in the art can readily determine how much asphalt mixture is required. In this regard, so as not to add either cost or weight to the finished article, it is not advisable to add more asphalt coating than is necessary.

Figure 2:
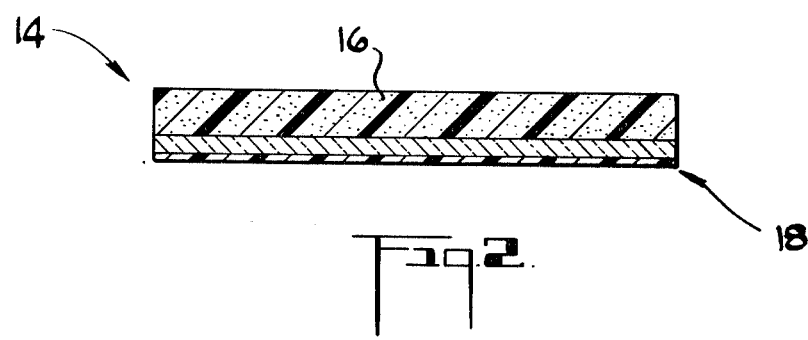
FIG. 2 is a cross-sectional view of a foamed resin body having adhered to at least one surface thereof a facing constructed in accordance with the present invention.

Inasmuch as composite article 10 can be made substantially completely water imprevious, that is, to the point that it is pinhole free, it of course makes an excellent roofing membrane. However, because of this characteristic, it can serve as an imprevious membrane upon which resin can be foamed and ultimately formed and the foam forming chemical (before foaming) will not pass through the membrane, via for example pinholes, and attack the surrounding apparatus. Once the foamed resin is formed, and mat is cured, the membrane, specifically composite article 10, acts as a facing therefor. An overall article of manufacture of this type is illustrated in FIG. 2 and generally designated by the reference numeral 14. This article is comprised of the foamed resin body and facing just discussed. The foamed resin body is designated by the reference numeral 16 and the facing is designated by the reference numeral 18 so as to distinguish it from composite article 10. Article of manufacture 14 may be used in a number of different ways and it is not intended to be limited to any particular end use. The specific resin making up body 16 and the degree to which it is foamed, that is, its density, and its ultimate thickness will depend upon this end use as will the particular characteristics of facing 18, that is, the particular base sheet and asphalt mixture making up the facing. Moreover, the ultimate intended use of article 14 will also dictate whether one side of body 16 includes a facing 18 as illustrated or whether both sides would include a facing and whether the facing 18 includes one or two film layers corresponding to films 12.

Where the article of manufacture 14 is to be used as a layer of insulation generally and roof insulation in particular, it is contemplated that foamed resin body 16 be foamed polystyrene resin or foamed polyurethane resin. It is contemplated that only one side of this body include a facing 18 and that the facing be identical to the preferred embodiment of composite article 10, as described above. The polystyrene or polyurethane resin is foamed in a conventional manner, utilizing conventional foaming agents, and is formed directly on facing 18, as stated previously. This is also done in a conventional manner. The foamed resin is allowed to cure in place on the facing so that the two adhere to one another. In this regard, where necessary, suitable known intermediate means for adhering facing 18 with body 16 may be provided.

Having described composite article 10 and article of manufacture 14 both generally and specifically, attention is now directed to a number of actual working embodiments of the present invention, which embodiments are provided for exemplary purposes only. In one embodiment, an asphalt mixture, hereinafter referred to as mixture #1, was prepared with the following ingredients in parts by weight:

| | |
|---|---|
| asphalt emulsion | 150 |
| water | 150 |
| talc | 10 |
| diatomaceous earth | 20 |
| bentonite clay | 8 |

The asphalt emulsion utilized was Johns-Manville's TOPGARD TYPE "B" asphalt emulsion which was previously discussed. The talc was Cyprus Industrial Minerals Company's FROST talc and the diatomaceous earth was Johns-Manville's 305 CELITE diatomaceous earth. The bentonite was supplied by Black Hills Bentonite Company under the tradename Tower Bond Bentonite. A sufficient amount of sodium hydroxide was added to give the mixture a pH of approximately 9. The mixture was thixotropic.

A second mixture, hereinafter referred to as mixture 190 2, was prepared and had the following ingredients, in parts by weight:

| | |
|---|---|
| asphalt emulsion | 100 |
| water | 250 |
| talc | 150 |
| bentonite clay | 2 |

The asphalt emulsion, the talc and the bentonite clay were the same as those selected for mixture #1. Sufficient sodium hydroxide was added to give the mixture a pH of 9 and like mixture #1, mixture #2 was thixotropic.

Three different composite articles 10 were constructed utilizing the two mixture described above. One composite article was made by coating one side of a base sheet with the mixture #1 and a second composite article was made by coating both sides of a base sheet with mixture #1. A third composite article was made by coating one side of a base sheet with mixture #2. In all three cases, the base sheet utilized was a glass fiber mat made by a wet forming process and utilizing textile type monofilament glass fibers only. These monofilament fibers, which were approximately 25.4 centimeters long and 13-14 microns in diameter, were held together by a urea formaldehyde resin binder. Approximately 19% of binder by dry weight of the mat was utilized. The mat in its entirety weighed approximately 1.05 lbs/100 ft$^2$ and was approximately 17 mils thick.

Several sample of each of the three composite articles were made in the same way, specifically as described above. The first composite article, that is, the one utilizing mixture #1 on one side of the glass mat, weighed approximately 3.62 lbs/100 ft$^2$. This meant that the asphalt mixture (solids only) weighed approximately 2.57 lbs/100 ft$^2$ (based on a mat weighing 1.05 lbs/100 ft$^2$). The second composite article, that is the one using mixture #1 on both sides of the mat, weighed approximately 4.87 lbs/100 ft$^2$ and hence the total solids for the mixture (both sides included) weighed approximately 3.82 lbs/100 ft$^2$. The third composite article, that is, the one utilizing mixture #2, weighed 3.87 lbs/100 ft$^2$ and hence the solids provided by the asphalt mixture weighed approximately 2.82 lbs/100 ft$^2$.

All three of these composite articles were tested for water impermeability, specifically to determine whether or not they were pinhole free. This was done by selecting a number of circular samples 4" in diameter. Each sample was placed across the opening in a container 3⅜" in diameter and the container was filled with 1 inch of water. The sample was sealed around the periphery of the container and the latter was turned upside down so that the water could only pass through the sample. This test was carried out on only the first two composite articles described and after 24 hours (the total length of the test) no water leaks were found, thereby indicating that the samples were pinhole free. Samples from all three of the composite articles were tested to see if they would pass urethane in its mixed chemical state, i.e. before or during but prior to completion of foaming. None of the samples did in fact pass the urethane, indicating that all three were pinhole free. In addition to these tests, samples from the second composite article were tested for blocking, that is, tackiness. Samples from this composite article were subjected to a temperature of 200° F. for 15 minutes, one under no pressure and one under a 1 psi load. There was no tackiness in either case. A second test was run under the same conditions but for 48 hours and under 1 psi load. No tackiness was observed.

In addition to the foregoing, urethane foam, in its uncured state, was foamed directly onto a sample of each of the composite articles described above. In all three cases, the foamed urethane went on without passing through the samples and in all three cases articles of manufacture similar to previously described articles 14 were formed. Once formed, hot asphalt, specifically 500° F. BUR 190 asphalt supplied by Johns-Manville Corporation, was poured onto the articles, specifically onto the facing of each. This hot asphalt caused the cured urethane foam to blister. It was found that this could be eliminated by perforating the facings after the foam was in place, specifically every ¼ inch, with pinprick type perforations. This eliminated the blistering from occurring.

The foregoing results should be contrasted with those results obtained when utilizing a non-thixotropic, standard shingle type coating asphalt mixture. One such mixture was used to coat a slightly lighter weight but otherwise substantially identical glass mat. The mat weighed approximately 0.8 lbs/100 ft$^2$ and used 13 micron glass fibers, 25 centimeters long. This composite article, which in total weighed about 6.4 lbs/100 ft$^2$ and hence utilized substantially more asphalt coating than is required by the present invention, was not pinhole free. This could be visually observed. Moreover, when tested for water penetration in the manner described above, it took only 25 minutes to observe the first drop through the sample and within a 24 hour period all the water had passed therethrough. Further, when subjected to 200° F., it was noted that the asphalt became very tacky.

In view of the foregoing, it should be quite apparent that the present invention provides for a composite article, whether used as a roofing membrane or as the facing for an article of manufacture including a foamed resin body, which is pinhole free and which does not become tacky when subjected to relatively high ambient temperatures. As stated previously, the base sheet of this composite article may be of any suitable type, but is preferably glass fiber mat. However, other types of mat, specifically asbestos mat and polyester mat were coated with a thixotropic asphalt mixture prepared in accordance with the present invention and were also found to provide an ultimate article which is pinhole free and stick resistant.

What is claimed is:

1. An article of manufacture comprising a foamed resin body having adhered to at least one surface thereof a composite article, said article of manufacture being made according to the process which comprises:
   (a) providing a fibrous mat having such characteristics as to permit the constituents of said resin body, prior to and during the foaming thereof, to pass therethrough;
   (b) providing an asphalt emulsion;
   (c) mixing said asphalt emulsion with an additive for making the resulting mixture thixotropic;
   (d) coating the side of said mat opposite the side to which said foamed resin body is to be adhered with said thixotropic mixture;
   (e) drying said coated mat so as to form a film on said mat, said film having such characteristics as to prevent the constituents of said resin body, prior to and during the foaming thereof, from passing through said film;
   (f) thereafter foaming said resin body in place directly on the other side of said coated mat; and
   (g) curing said foamed resin body, whereby said coated mat forms a facing for said cured foamed resin body.

2. An article of manufacture according to claim 1 wherein said additive includes bentonite clay.

3. An article of manufacture according to claim 1 wherein said additive includes a substance for making the pH of said mixture basic.

4. An article of manufacture according to claim 1 wherein the pH said mixture is approximately 9.

5. An article of manufacture according to claim 1 wherein said side of said mat is coated with said thixotropic mixture at a rate such that the film on said side after drying weighs approximately 2.57 lbs/100 ft$^2$.

6. An article of manufacture set forth in claim 1 wherein said side of said mat is coated with said thixotropic mixture at a rate such that said film after drying weighs approximately 2.82 lbs/100 ft$^2$ of said mat.

7. A process for making an article of manufacture comprising:
   (a) providing a fibrous mat having such characteristics as to permit the constituents of a foamable resin body prior to or during the foaming thereof, a pass therethrough;
   (b) providing an asphalt emulsion;
   (c) mixing said asphalt emulsion with an additive for making the resulting mixture thixotropic;
   (d) coating on side of said mat with said thixotropic mixture;
   (e) drying said coated mat so as to form a film on said mat, said film having such a characteristics as to prevent the constituents of said resin body, prior to and during the foaming thereof, from passing through said film;
   (f) thereafter foaming a resin in place directly on the other side of said coated mat; and
   (g) curing said foamed resin, whereby said coated mat forms a facing for said cured foamed resin.

8. A process as set forth in claim 7 wherein in the step of mixing includes adding an additive for making as the pH of said mixture about 9.

9. A process as set forth in claim 7 wherein said additive comprises a bentonite clay.

* * * * *